INVENTOR
William F. Galey
George W. Misson
Wolf, Hubbard, Voit + Osann
ATTORNEYS

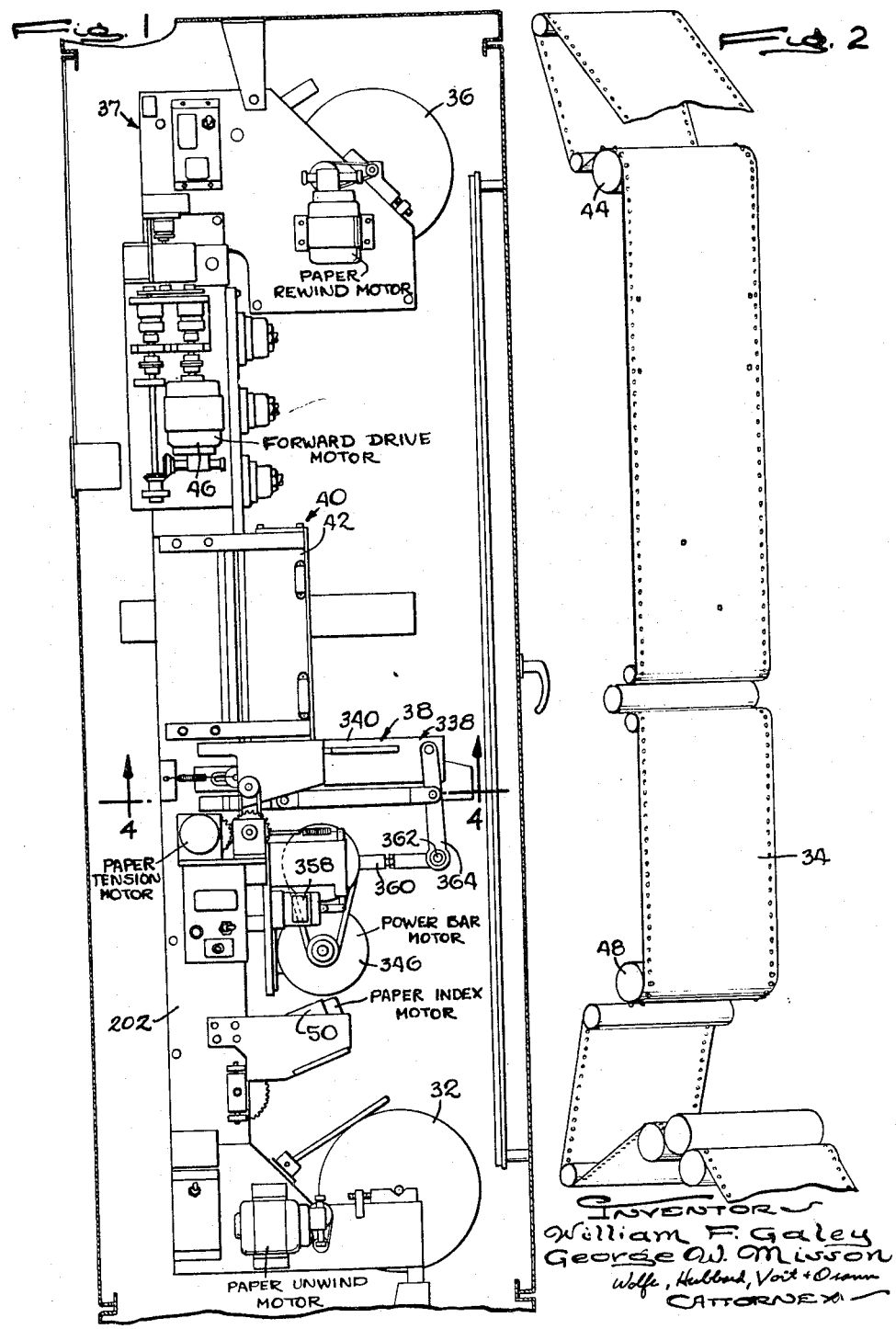

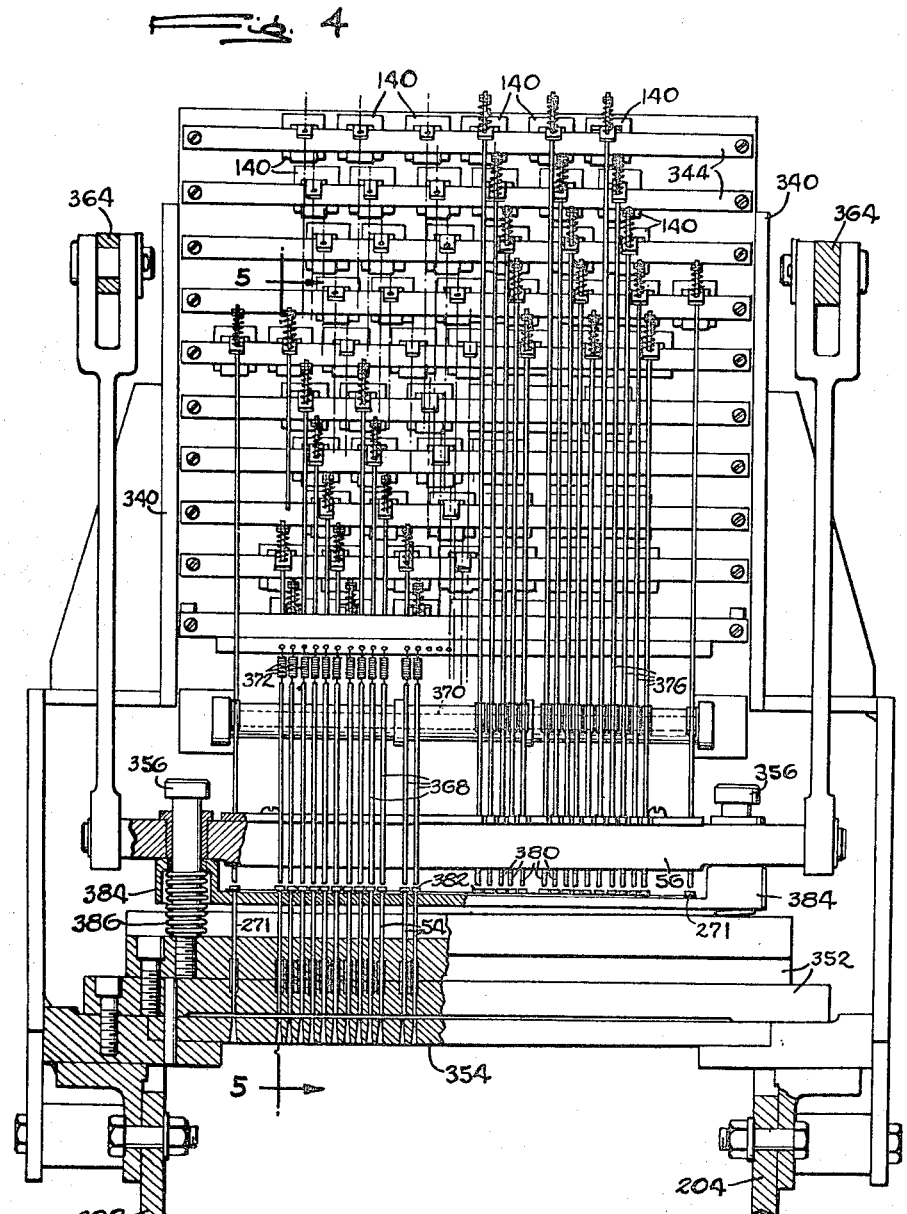

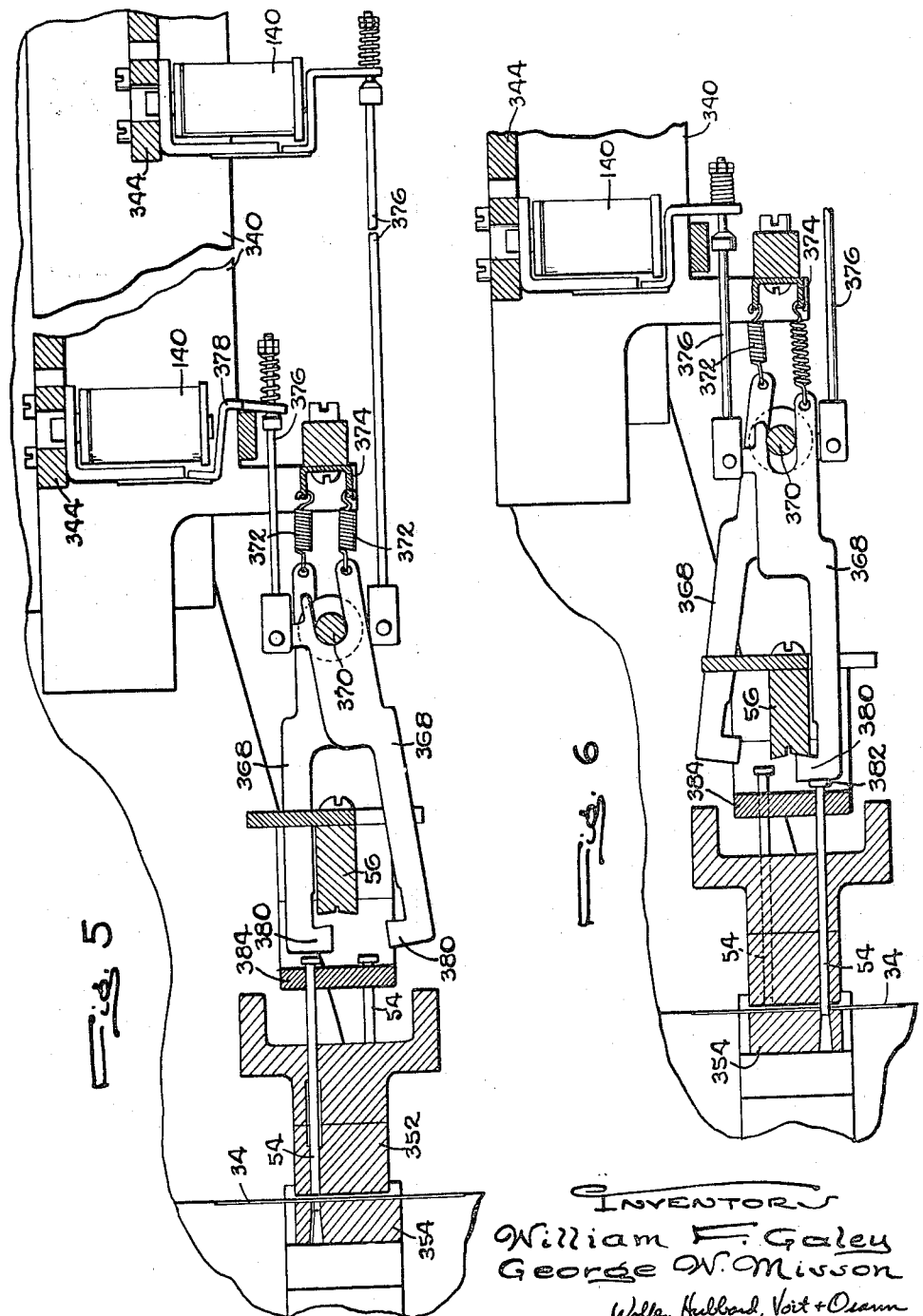

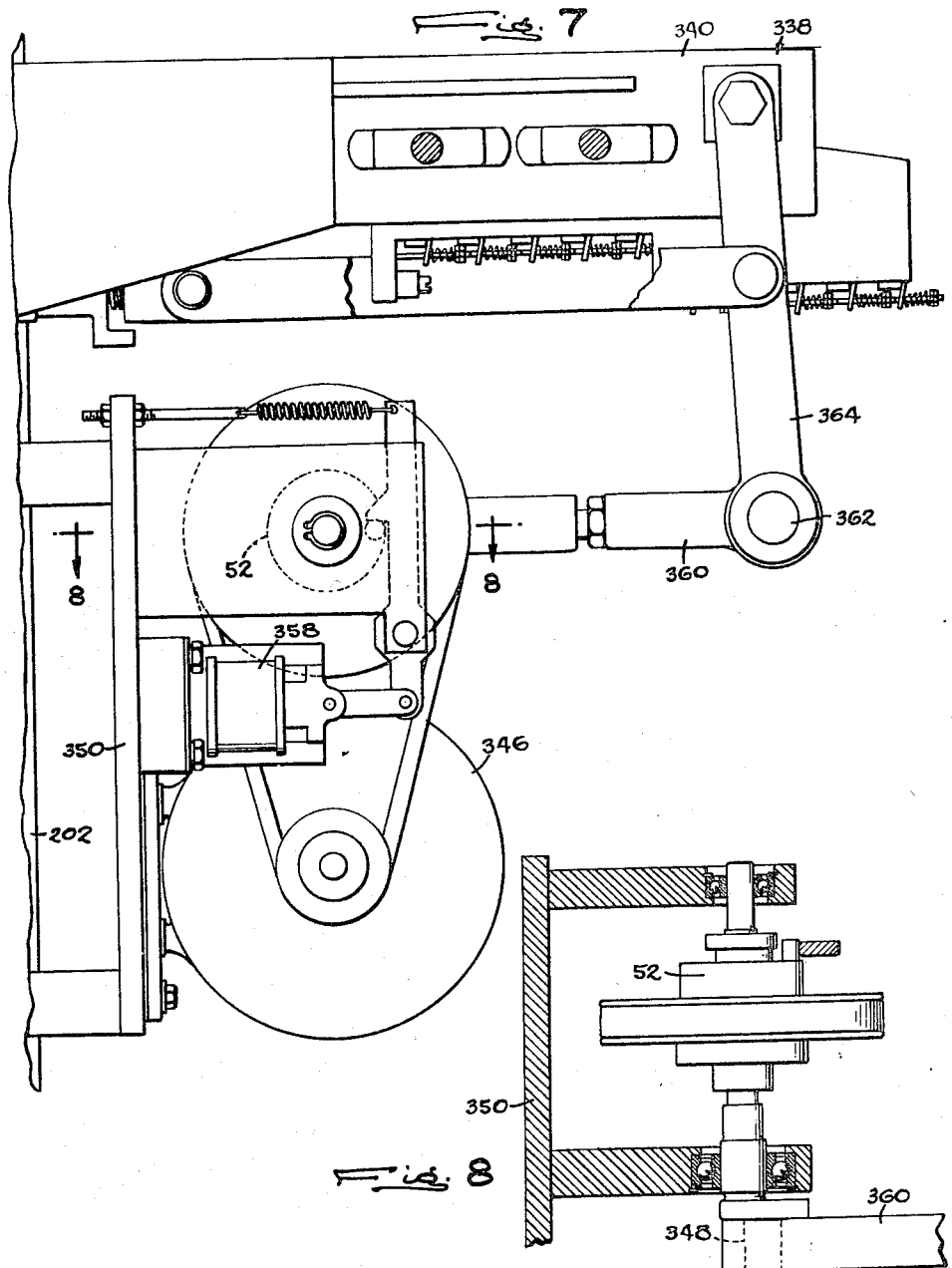

United States Patent Office 3,285,509
Patented Nov. 15, 1966

3,285,509
MULTIPLE PUNCHING MECHANISM FOR
PAPER TAPE
William F. Galey, Saxonburg, and George W. Misson, Pittsburgh, Pa., assignors to Pittsburgh Plate Glass Company, Allegheny County, Pa., a corporation of Pennsylvania
Original application Nov. 2, 1959, Ser. No. 850,460, now Patent No. 3,191,857, dated June 29, 1965. Divided and this application May 6, 1965, Ser. No. 468,661
3 Claims. (Cl. 234—115)

This application is a division of our copending application Serial No. 850,460, filed November 2, 1959, which passed to issue June 29, 1965, as U.S. Patent No. 3,191,857.

This invention relates in general to the manufacture of plate glass and particularly to a process for inspecting sheets or a ribbon of polished and ground plate glass for defects, and directing the cutting of the glass into smaller, saleable sizes according to the defects which are found to be present.

In the manufacture of plate glass heretofore, the manner of cutting a large sheet or continuous ribbon of plate glass into smaller desired sizes has been determined by trained personnel after visual inspection of the glass for the presence of defects which are likely to affect its optical and mechanical properties. The defects which may be present in the body of or on the surface of polished plate glass sheets or ribbon and which mar the optical properties of the glass sufficiently to be discerned by the human eye, are of certain well-known and picturesquely named kinds. Examples of these are: point type defects such as stones or sand holes, gross surface defects such as sleeks and scratches, and microscopic surface defects such as sweep and peel.

It has been found that as various grades of plate glass are required for various purposes, certain defects, if not too severe, may be permitted in the smaller sizes that are cut from the larger uncut sheets or ribbon. While glass which is to be used for high quality mirrors is required to meet quality standards far higher than required for glazing quality plate glass, certain minor defects may yet be permitted in plate glass graded for mirror use. More severe defects (mirror defects), while lowering the quality of the glass below mirror grade, however, are acceptable in plate glass graded "glazing." Glass containing defects of a greater severity, such that would lower the quality so that it would be judged below glazing grade, is called "cullet." Such defects are called "glazing" or 'total' defects. To produce usable sizes of glass of mirror or glazing grade, therefore, the defect containing areas of the glass must be excluded by the cutting procedure followed in partitioning the sheets or ribbon. And, it is clearly apparent that in order to obtain the greatest yield of usable glass in the desired smaller sizes from the large uncut sheet or ribbon, both the severity of the defects as well as the area that they cover, will enter into the determination of the manner in which the glass should be partitioned and cut.

In fitting or piecing out different combinations of various sizes from the usable areas of the large uncut plate glass sheets or ribbons, it is desired, of course, to throw away or downgrade as little of the glass as is necessary.

Time and timing are always of concern since the operation must maintain pace with high production manufacture in which glass in a given width, either as large separate sheets or as unbroken ribbon, moves at a continuous rate as it is formed and finished.

Efficiency goals in laying out the usable areas of the total glass output into smaller sizes have in fact been limited by the number of factors which skilled layout men have found it practical to consider. The possible factors are many. For example, a large number of predetermined sizes are marketable and more than one grade may also be involved. Inspection is required for the total output since the defect distribution is not predictable. Relative preference or demand for the various sizes may also be factors. The demand for particular sizes may change in accordance with the quantities which have already been cut. Obviously, the number of choices of possible glass sizes which must be evaluated before a cut is made is very large if all of the factors or choices are considered.

In the interests of reducing storage and handling of the glass produced before shipping, close control of elapsed time is also involved. Desirably the sequence of inspection for defects, the presentation of all the relevant data, the making of economic cutting decisions by the layout men, the actual cutting, and the routing of the cut glass sizes to respective packing stations, is an essentially on-line procedure.

It is the general object of this invention to provide a process for directing the cutting of plate glass in pace with its production which utilizes manual, visual inspection similar to that which has been carried out heretofore, but eliminates human calculation in correlating supplied data on specific defect locations in a sheet or ribbon to be cut on the one hand, and on desired sizes on the other hand, to reach a cutting determination aimed at granting the most effective overall yield of glass. While any manual, visual inspection procedure necessarily requires human judgment in evaluating the severity of the defects, by reducing the number of decisions requiring subjective evaluation, the object is to obtain greater uniformity in glass grading with less waste than has been achievable heretofore with known inspection, partitioning, and cutting procedures.

Another object is to provide a process and apparatus for partitioning sheets or a ribbon of glass into desired smaller sizes wherein both the severity of the defects as well as their distribution are considered in determining the manner in which the glass should be cut.

Another object is to provide in pace with the glass production a secondary record of the defects in the glass which comprises an analogue of the defect spotted glass sheet or ribbon and a means for storing defect location information.

A further object is to provide a defect storage apparatus wherein a secondary record of defect locations is made by punching holes in a paper tape at locations coordinately correpsonding to the locations of the defects in the glass.

Still another object is to provide for read-out of the defect location information found on the secondary record, so that a cutting determination may be made by computations based on the data read-out to partition the sheet or ribbon into smaller programmed sizes.

More specifically, it is an object to provide means for read-out of defect location information on the secondary record for progressively greater (or smaller) lengths of glass starting with a point on the secondary record corresponding to the leading edge of the sheet or ribbon of glass, so that based on the read-out data, programmed widths may be fitted into the usable lengths of the glass and the cut for which the best fit is provided may be chosen.

Other objects will become apparent as the following description proceeds taken together with the accompanying drawings, wherein:

FIGURE 1 is a side elevational view of the defect storage apparatus;

FIG. 2 is a perspective view illustrating the movement of the paper tape through the defect storage apparatus;

FIG. 4 is a sectional view taken substantially in the plane of lines 4—4 of FIG. 1;

FIG. 5 is a sectional view taken substantially in the plane of lines 5—5 of FIG. 4, showing certain rockers in and the power bar retracted;

FIG. 6 is a sectional view taken similarly to FIG. 5 with certain rockers in and the power bar advanced;

FIG. 7 is an enlarged side elevational view of the punch apparatus with parts broken away; and FIG. 8 is a sectional view with parts broken away taken substantially in the plane of lines 8—8 of FIG. 7.

Figure 3:
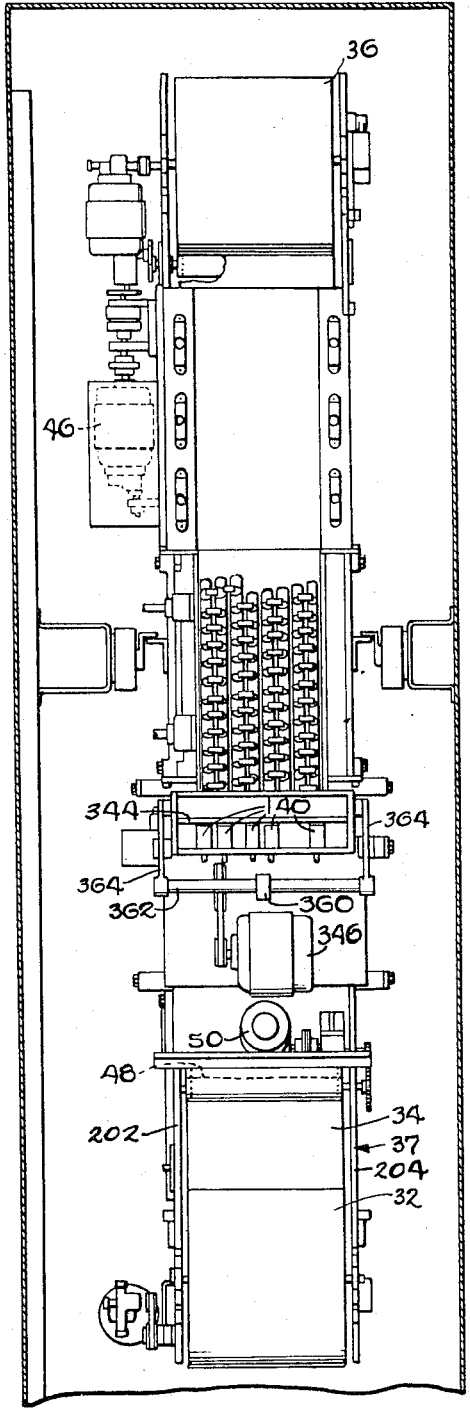
FIG. 3 is a front elevational view of the defect storage apparatus.

While the invention is susceptible of various modifications and alternative constructions, an illustrative form of the invention has been shown in the drawings and will be described in considerable detail. It should be understood, however, that there is no intention to limit the invention to the form disclosed, on the contrary, the invention is to cover all modifications, alternative constructions and equivalents falling within the spirit and scope of the invention as expressed in the appended claims.

In order to provide the requisite information as to defects appearing in the glass, which information is used in determining the manner of partitioning the glass, the glass is first manually inspected for the presence of defects, and those of such severity as to affect its quality are dimensionally located, by colored crayon marks placed on the surface of the sheet or ribbon. The cuts are made according to cutting determinations evolved by computation to partition the glass into smaller defect-free rectangular pieces excluding the defect containing areas. While the expression "defect-free" is used herein, it is recognized that no portion of the glass is fully defect-free, and by this expression is meant free from defects of such severity as would lower the quality of those areas of the glass as might contain them to below a certain specified (glazing or mirror) grade. Necessarily, therefore, "defect-free" also requires the standard being applied, that is, free from "mirror" or "glazing" defects.

In the present industrial apparatus, computations are made automatically by a computer supplied with defect location information. A computer having means particularly suited to making the requisite computations is shown in the copending application, Serial No. 850,360, now U.S. Patent No. 3,246,550, filed November 2, 1959, by William F. Galey, Joseph A. Gulotta and Forrest K. Unbel, entitled, Length and Area Partitioning Methods and Apparatus. The computer is supplied with defect location information, and at a speed such that the glass may be cut according to the cutting determinations made by the computer in pace with its continuous production and movement along the conveyor to the glass cutting apparatus. The cutting determinations are made following a logic involving fitting or piecing out different combinations of various programmed sizes from the usable, defect-free areas of the large glass sheets or ribbon. The computer may be installed at any convenient location near to or remote from the production line and is supplied with defect information, and transmits commands to the glass cutting apparatus through suitable electrical connections.

In order to make the computations by means of which the cutting determinations are evolved, the computer is supplied upon its command with information as to the defects in the glass. Mounted over the conveyor on a bridge located spaced from the glass cutting apparatus is a photosensitive defect detection apparatus which examines the glass for the presence of defect-marks as it moves along the conveyor past the bridge and provides dimensional information as to the location of the defects. This information is supplied to a defect storage apparatus which may be located either at the computer installation, or elsewhere, and is provided to produce a secondary record to store the defect location information so that it is available to the computer when required. This secondary record of the defects location is made in pace with the movement of the glass along the conveyor and, in the present case, comprises a paper tape prepared as an analogue of the defect bearing glass sheets or ribbon. This secondary record provides the defect location information in a form that is readily usable, namely, in the form of a hole punched in the tape at a dimensional location which corresponds to the dimensional location of the defect with respect to the leading edge and the side edge of the glass sheet or ribbon.

The present invention relates to the punching mechanism by which holes corresponding to the dimensional location of the glass defect are punched into the moving paper tape.

Each defect storage unit includes, as illustrated more particularly in FIGS. 1–3, separate punch and read-out sections. The storage units are mounted vertically in a cabinet, and each comprises a vertical frame having means at the lower end for support of a supply roll 32 of paper tape, which unwinds to supply the tape 34 which is fed upwardly to a rewind roll 36 at the top of the unit frame 37. The path of the paper is illustrated in FIG. 2 and proceeds from the supply roll upwardly through the punch section 38 and the read-out section 40, at a rate determined by the speed of movement of the glass on the conveyor.

The paper is drawn through the read-out head 42 of the read-out section by a paper drive which comprises sprockets 44 engageable in holes in the edges of the paper tape driven by a forward motor 46 by means of a transmission mounted on the frame. The transmission is controlled from the computer so that a defect information containing portion of the paper tape is moved into the read-out head and stopped for read-out purposes and then advanced following the read-out operation.

The paper tape is released from the supply roll 32 by a paper indexing means which includes sprockets 48 engageable in the holes of the paper tape driven by a drive motor 50 coupled to a one-revolution clutch 52 which connects the motor to the sprocket 48 to operate it intermittently and thereby feed the paper at a timed rate into the punch section 38 of the apparatus. The motor 50, clutch 52, and sprocket 48 are all suitably mounted on the frame adjacent the supply roll 32. This one-revolution clutch 52 is adapted for operation in accordance with the speed of the glass on the conveyor, so that movement of the paper tape through the punch section, while intermittent, is at the average speed to scale of the movement of the glass.

In accordance with the invention, the punch holes are formed in the paper tape 34 by a punch mechanism in the punch section which includes two rows of punches 54 (FIGS. 5–6) each punch being selectively operable to be driven through the tape 34 by means of a motor driven, intermittently operated, power bar 56. A one-revolution clutch 54 connected to operate the power bar 56 is controlled so as to be synchronized with the paper movement and operates the punches during the period the paper is stopped in its intermittent feed through the punch section.

The punch section, as FIGURES 4–6 show, includes a punch mechanism having punches 54 which may be selectively actuated to produce a perforation in the paper tape in a mosaic corresponding to a mosaic containing defect on the glass. The information as to defect locations is supplied to the punch mechanism through separate channels leading from the elements of the photosensitive detection apparatus, through the discriminator and buffer storage circuits. In addition to the defect hole punches 54, there are also provided punches 271 for making perforations in a row at one side of the tape for recording as a reference point the location of the leading edge of an uncut sheet or ribbon of glass.

As previously indicated, the photosensitive elements and the punches 54 for making the defect holes are similarly arranged in two staggered rows of the respective devices each. In this manner the odd-numbered moisaics are viewed on the glass as it passes the bridge by a photosensitive element in the first and the even numbered mosaics by an element in the second row, the first row being upstream. The punches 54 are similarly arranged. While the paper tape is stopped in its intermittent motion through the punch section, when glass is passing the bridge, a defect-mark caused change in condition of any photosensitive element causes the corresponding punch in either the first or second row to be actuated to form the hole in the tape.

Turning now to FIG. 7, the punch mechanism is carried on a frame 338 which is supported on the vertical side frame members 202, 204 of the defect storage unit. The punch coils, in the form of solenoids 140, for the punches 54, are carried between side plates 340 (FIG. 4) on crossbars 344. At the lower end of the punch section is a motor 346 which supplies the power for operating the punches 54. The motor 346 and a belt driven crank 348 are carried on a base member 350 fastened to the side frame members 202, 204 of the defect storage apparatus.

Considering in more detail the construction of the punch mechanism, it will be noted upon reference to FIGS. 5–6 that the perforations are made in the tape by elongated punches arranged in parallel rows. The punches 54 are rectangular in section and are supported for horizontal sliding movement toward the paper tape, the latter being positioned in the apparatus in a vertical plane, by a fixed guide plate 352 which is formed with bores to receive the punches. As shown in FIGS. 5 and 6, the punches, when actuated, pass through the tape 34 and enter a die 354 to form a neat perforation in the tape. The punches are actuated by a power bar 56 which, as shown in FIG. 4, is mounted over the punch guide plate 352 and for movement toward the latter being slidably carried at each end on a fixed bolt 356. The power bar is actuated by the crank 348 shown in FIG. 8 when a solenoid 358 pulls in to release a one-revolution clutch 52. The solenoid 358 is supplied with pulses from the glass clock so as to cause the crank to operate the power bar synchronized with the movement of the paper tape. In the present case the power bar 56 is operated when the paper is stopped in its intermittent advance through the punch section. To connect the crank 348 to the power bar 56 the outer end of a connecting rod 360 operated by the crank is fastened to a power shaft 362 which is connected at each end to levers 364 which in turn are supported for pivotal movement at the other end on the punch frame side plate 340. The levers 364 are connected at about the midpoint to a link for reciprocation of the latter when the crank 348 is operated, the levers 364 being arranged as levers of second class.

Rockers 368 (FIG. 5) are associated with each defect hole punch 54 and the leading edge hole punch 271 for selectively transmitting the motion of the power bar 56 to actuate the punches. Each rocker 368 is notched, as shown in FIGS. 5 and 6 to bear against a shaft 370 forming a sliding connection. The rockers 368 are normally pivoted by a spring 372 connected to the rocker and anchored to a lug 374 on the punch mechanism frame. The end of the rocker 368 adjacent the shaft 370 is connected by means of a resiliant connection and rod 376 to the armature 378 of a punch coil which is electrically connected to be actuated by the defect-mark caused pulses. When a pulse energizes the punch coil to draw up the armature 378, the motion of the latter, through the yieldable connection and rod 376 pivots the rocker 368 so that the inturned end 380 overlies the punch. When the power bar 56 is advanced from the retracted position of FIG. 5 to the position of FIG. 6, the rockers 368 that are "in" are moved into contact with the heads 382 of the associated punches 54 and then drive the latter through the tape. Each rocker 368 is notched, one side being yieldingly fastened to the punch coil armature 378 and the other side being held by the spring 372. The rocker 368 thus bears on the shaft 370 to form a pivotal connection and is slidable on the shaft so that the rocker can move with the power bar 56 when the latter is actuated. In the retracted position of the power bar, as shown in FIG. 5, there is clearance between the heads 382 of the punches 54, the ends 380 of the rocker 368 when in either position, and the power bar 56, so as to permit the rocker to move in and out freely and without interference, the arrangement being such that an extremely low current in the punch coil is effective to control the operation of each punch.

To provide a positive return for the punches, a lift bar 384, shown in FIG. 4, is slidably carried on the fixed pins 356 which support the power bar 56. The lift bar 384 is actuated by the power bar on the advance stroke of the latter, and is returned by a pair of compression springs 386 with the power bar on its return stroke. Each punch has a head 382 resting on the lift bar 384.

We claim as our invention:

1. In a punch mechanism for making perforations in a paper sheet, the combination comprising a frame, a die mounted to said frame adjacent one side of the paper, a punch positioned facing said die on the opposite side of the paper, a reciprocable power bar aligned with and spaced from said punch, a rocker member interposable between said power bar and said punch to form a motion-transmitting connection therebetween, said rocker member being yieldably and slidably carried by said frame from a support overlying said punch for movement by said bar to operate said punch, and interposing means including a solenoid for selectively moving said rocker member into iterposing position.

2. In a punch mechanism for making perforations in a paper sheet, the combination comprising a frame, a die mounted to said frame adjacent one side of the paper, a punch positioned facing said die on the opposite side of the paper, a reciprocable power bar aligned with and spaced from said punch, a rocker member interposable between said power bar and said punch to form a motion-transmitting connection therebetween, said rocker member being pivotably, yieldably and slidably carried by said frame from a support overlying said punch for movement by said bar to operate said punch, and interposing means including a solenoid for selectively moving said rocker member into interposing position, said interposing means including linkage means for pivoting said rocker member into interposing position and resiliently accommodating the reciprocation of said rocker member during a punch stroke.

3. In a punch mechanism for making perforations in a paper sheet, the combination comprising a frame, a die mounted to said frame adjacent one side of the paper, a punch positioned facing said die on the opposite side of the paper, a reciprocable power bar aligned with and spaced from said punch, a rocker member interposable between said power bar and said punch to form a motion-transmitting connection therebetween, said rocker member being pivotably, yieldably and slidably carried by said frame from a support overlying said punch for movement by said bar to operate said punch, said rocker member having an elongate notch cooperating with said frame, retaining means including a spring for resiliently retaining said rocker member to said frame, and interposing means including a solenoid for selectively moving said rocker member into interposing position, said interposing means including linkage means for pivoting said rocker member into interposing position and resiliently accommodating the reciprocation of said rocker member during a punch stroke.

References Cited by the Examiner

UNITED STATES PATENTS

| | | | |
|---|---|---|---|
| 2,970,753 | 2/1961 | Lisinski | 234—115 |
| 2,998,913 | 9/1961 | Alonas | 234—115 |
| 3,038,654 | 6/1962 | Steiner | 234—115 |
| 3,051,377 | 8/1962 | Bradbury | 234—115 |
| 3,065,299 | 11/1962 | Frey. | |

WILLIAM S. LAWSON, *Primary Examiner.*